Feb. 9, 1943.  F. MARBURG  2,310,643
SUPERCHARGED COMPRESSION IGNITION INTERNAL COMBUSTION ENGINE
Filed June 7, 1941  3 Sheets-Sheet 1

Feb. 9, 1943.  F. MARBURG  2,310,643
SUPERCHARGED COMPRESSION IGNITION INTERNAL COMBUSTION ENGINE
Filed June 7, 1941  3 Sheets-Sheet 3

Fig.6

Inventor
Francis Marburg

Patented Feb. 9, 1943

2,310,643

UNITED STATES PATENT OFFICE 2,310,643

SUPERCHARGED, COMPRESSION-IGNITION, INTERNAL COMBUSTION ENGINE

Francis Marburg, St. Petersburg, Fla.

Application June 7, 1941, Serial No. 397,087

44 Claims. (Cl. 123—71)

My invention broadly refers to supercharged compression-ignition internal combustion engines. The present application is a continuation, in part, of my application Ser. No. 307,495 of Dec. 4, 1939, for improvements in two cycle, supercharged, compound, Diesel engines. The illustrations attached hereto, solely show highpressure power units, preferably used in connection with air-compressors and lowpressure fluid-expansion power units, either of the type shown by applicant heretofore, or of any other known convenient type.

In his previous application, applicant's main purposes have been, to construct a successful compound engine, producing smooth operation and much higher thermodynamic efficiency and higher M. I. P., than possible heretofore, and providing extremely strong internal air-cooling of the high pressure power unit combustion chamber.

The present invention refers to additional internal cooling of the axially middle and axially inner highpressure power cylinder portions and to internal power piston cooling, for the purpose of further raising the permissible, safe limits of supercharging, which limits mainly depend on the amount of internal cooling of the power cylinder and of the power piston, as will be fully explained hereinafter.

In his previous application, the writer explained, that heat-conduction through metal walls, is relatively very slow, as compared with almost instantaneous internal heat-absorption, or heat-radiation, at extremely high temperatures. Heat-ray action increases with the fourth power of the temperature difference of gases and metal walls. Skin-deep, red-hot metal surfaces, are produced almost instantaneously, during very intense combustion. During expansion, the rapidly cooling gases, at first, mainly re-absorb return heat-rays emanating from the red-hot surfaces, thus cooling these surfaces and momentarily re-heating the gases, whereupon heat-convection continues to act strongly as a result of continued powerful gas twirl within applicant's combustion chamber, the rapidly expanding and cooling gases continuing to re-absorb heat from the hot walls throughout expansion. All of the heat thus re-absorbed by the expanding gases, is instantaneously changed into kinetic energy, while a portion of the heat, absorbed by the wall, penetrates deeper below the surface and is ultimately absorbed by external cooling-fluid and is lost. The writer clearly realized, that very strong internal cooling is absolutely necessary in a highly supercharged power unit and he realized, that this can be accomplished, without relatively great heat-losses, within a highly supercharged combustion chamber, because it is possible to construct the latter relatively very compact, thus greatly reducing the heat-exposed wall surface area and the heat-conducting cross-sectional wall area per I. H. P.

As explained heretofore, two of the main problems, in a highly supercharged power unit, are, to construct the latter in such manner, that it can withstand the extremely great concentration of B. t. u. within the compact combustion chamber and that lubrication of the power cylinder and of the power piston rings remains efficient. The solution of these problems has been applicant's previous object and it is the main object of his present invention.

Strong twirl of scavenging-air, has heretofore been carefully avoided within combustion chambers, in order to avoid excessive heat-losses, as a result of heat-convection during scavenging and combustion. Nevertheless, moderate scavenging-air twirl has been frequently employed, because scavenging as well as mixture of fuel and air and combustion have been considerably improved thereby, thus overbalancing the heat-absorption losses, caused by the twirling scavenging air. Applicant originally explained, that the conditions within his high-compression, highly supercharged, very compact, compression- and combustion-chamber, are totally different from the conditions within a pancake—or very irregular-shaped compression—or combustion-chamber, of a highcompression, non-supercharged, power unit. Within applicant's compact chamber, relative heat-absorption—and heat-conduction-losses, even with powerful twirl, can, at most, be only a fraction of the corresponding heat-losses, occurring within a non-supercharged power unit, per I. H. P. Compounding of the highly supercharged power unit, furthermore, permits utilization of far greater total pressure—and temperature-ranges, than possible in non-supercharged engines. Powerful twirl, for reasons explained by applicant heretofore, at very high compression, is only feasible within a compact, highly supercharged compression chamber, permitting of far better distribution and mixture of fuel and air, than has been possible heretofore without excessive heat-conduction losses. The extremely dense, more highly compressed, hotter air, within applicant's power unit, causes minute fuel drops, entering into the combustion chamber at tremendous velocity, to flatten, break up and gasify, almost instantaneously, greatly reducing lag of ignition, producing complete combustion, almost as quickly as fuel is injected, thus preventing any considerable momentary accumulation of fuel, even within high speed engines. Such accumulation of fuel, heretofore, produced violent explosions, which are herein avoided. Applicant's novel conclusions, are based on well established, known, scientific facts, substantiated by applicant's experience in the art. As in the writer's previous invention, it is the purpose of the present invention, to keep maximum temperatures and maximum pressures, below those experienced in some of the present, direct-airless-injection, high-speed, compression-ignition, engines, while mean temperatures and M. I. P. and the I. H. P. for a given power piston displacement, in applicant's high pressure power unit, may be many times as high as in a non-supercharged power unit, of the same power piston displacement.

Much has been explained by applicant in his previous above said application, to which is referred herewith. Some of the writer's previous statements are repeated herein, because they relate to the fundamental issues of high supercharging and compounding, which must, more or less, be considered jointly. Before referring to the attached drawings, applicant desires to set forth and explain definitions of certain terms, occurring frequently in the specification and claims.

"Axially outer portions" means portions, being relatively distant from the axis of the crankshaft, while "axially inner portions" means portions being relatively near to the crankshaft axis. The same definitions apply to analogous terms or expressions, such as for instance "outwardly" and "inwardly" or "outer" and "inner," unless differently specified. Other terms occurring in the specification and claims, will be defined hereinafter, whenever required.

Referring now to the attached drawings, showing various embodiments of my invention, Fig. 1 shows a vertical cross-section through a power unit, illustrating my invention, Fig. 1a being a continuation of the same cross-section, showing the axially outer end of the power unit. Figs. 2 and 3 are horizontal cross-sections on lines 2—2 and 3—3, respectively, of Fig. 1.

Figures 1, 1A, 2, 3:
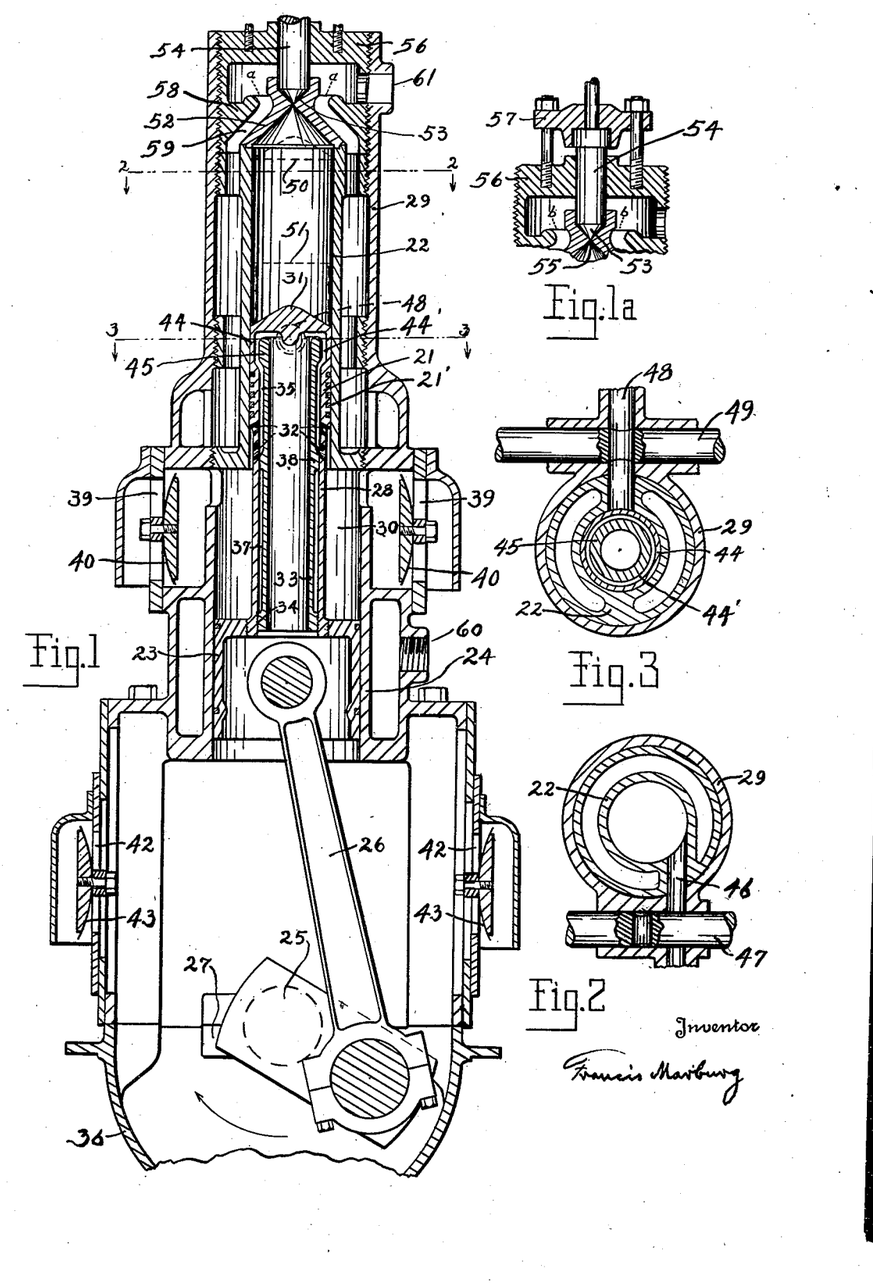

Referring now specifically to Fig. 1, the axially outer portions 21, of the piston, serve as a power piston, containing piston rings 21', sliding snugly within the power cylinder 22, while the axially inner piston portions 23, are of larger diameter than the power piston and serve as a crosshead, sliding snugly within the cylindrical guide 24. The crosshead and guide absorb substantially all side-thrust and simultaneously act as a double-acting cooling-gas pump piston and as a cooling-gas pump cylinder, as explained more fully hereinafter. The crosshead is driving a crankshaft 25, by means of the connecting rod 26, the crankshaft being supported in bearings 27. Axially middle piston portions 28, as shown, are of lesser diameter than the power piston. As illustrated, the power cylinder 22 is screwed into the main casing 29, while the cylindrical guide 24, as shown, is a portion of the casing and is arranged coaxially with and axially inwardly from the power cylinder. The axially middle piston portions, the internal surfaces of the axially inner portions of the power cylinder and of the axially outer portions of the guide, the axially outer surface of the crosshead and the axially inner surface of the power cylinder, together, form a continuous cooling-gas passage 30, through which cooling-gas, meaning fuel-free air, is forced to flow, as explained hereinafter. The piston is hollow throughout, except at its top 31. Perforations 32, pass through the wall of the hollow piston, adjacent to the power piston. As shown, an inset 33 is screwed into the middle piston portions at 34. The middle piston portions, in turn, as shown, are screwed into the crosshead. The power piston preferably is made of drawn steel, requiring lightness, great strength, great heat-conductivity and great heat-resistance. As illustrated, the piston portions can be assembled or taken out of the power unit, while the power cylinder is within the main casing, if desired. An annular clearance space 35, is provided between the power piston and the inset, for reasons which will be understood after the operation of the power unit has been fully explained. As shown, this clearance space communicates at its axially inner end with the perforations 32 and at its axially outer end, adjacent to the piston top, with the hollow within the inset and with the hollow crosshead and the crankcase 36. 37 is an annular heat-insulating space, provided between axially inner portions of the inset and the middle piston portions, for reasons which will be understood after the invntion has been more fully explained. 38 is a thickened annular portion of the inset, fitting into the middle piston portions.

As illustrated, the cooling-gas inlet ports 39, are controlled by the inlet valves 40 and as shown, are open, permitting cooling-gas to flow into the annular cooling-gas passage 30, while the piston is moving axially inwardly and while the cooling-gas outlet ports 42, controlled by the outlet valves 43, as illustrated are also open. It is clear, that the construction permits cooling-gas to be sucked into the inlet ports 39, while heated cooling-gas simultaneously escapes from the crankcase 36. The valve-controlled inlet ports 39, the cooling-gas passage 30, the perforations 32, the annular clearance space 35, the hollow within the inset 33, the hollow within the crosshead 23, the crankcase 36 and the valve-controlled cooling-gas outlet ports 42, together, form a cooling-gas group and, as shown, are in series and in communication with each other, during the entire inward piston stroke. During the outward piston stroke, the inlet valves 40, may be open, more or less, or they may be closed, depending on the respective displacements at the top and at the bottom of the crosshead and on the vacuum created within the crankcase and depending on the relative areas of the cooling-gas inlet and outlet valves and on the cross-sectional areas of other portions of the cooling-gas group, as will be better understood hereinafter. During outward piston stroke, the outlet valves 43, are both closed, producing a partial vacuum within the crankcase, as stated. This partial vacuum and the simultaneously higher pressure, produced within the cooling-gas passage, cooperate, causing strong cooling-gas circulation throughout the group, in direction from the cooling-gas passage towards the crankcase, thus internally powerfully cooling the power cylinder and the power piston. This will be further explained hereinafter.

If the cooling-gas circulates in the above said series and sequence, the power cylinder wall and the power piston wall containing the piston rings, are internally cooled, before the cooling-gas gets into contact with the hot inner surface of the piston top. It is possible, to efficiently internally cool the power cylinder and the power piston by circulating cooling-gas throughout the group, either mainly in one direction or mainly in the opposite direction, but internal power cylinder cooling is most efficient, with least waste of energy, if a given amount of cooling-gas is circulated in the above said series and sequence, at moderate cooling-gas pressure and at relatively low initial cooling-gas temperature. Applicant broadly claims circulation of cooling-gas, which means substantially fuel-free air throughout the group, during at least half of a piston stroke, without causing return flow of a considerable amount of cooling-gas in the opposite direction, during the opposite piston stroke. It must be understood, that in the illustrated construction, with the valve arrangements shown therein, during the inward piston stroke, a small portion of the cooling-gas, always flows back through the group, in direction from the crankcase to the cooling-gas passage. This return flow, of more or less pre-heated cooling-gas, can and should be kept relatively very small, by making the total opening-area of the valve-controlled inlet and outlet ports, each considerably greater than the cross-sectional passage-area of other portions of the cooling-gas group. It is essential, that communication between at least one end of the group and the atmosphere, either adjacent to the cooling-gas passage, or adjacent to the crankcase, is automatically valve-controlled. If communication with the atmosphere, at each end of the cooling-gas group, is automatically valve-controlled, cooling-gas circulation is more positive, under otherwise similar conditions. If, in the latter case, one or several valves, at one end of the group, should get out of order, cooling-gas circulation would nevertheless continue in the same direction as heretofore. If, instead as shown, the cooling-gas inlet valves should be arranged where the cooling-gas outlet-valves are shown and vice versa, the cooling-gas flow would be completely reversed, but internal cooling may nevertheless be efficient. It can not be the object of this application, to illustrate all possible valve combinations and all possible means, producing cooling-gas circulation, throughout the group. Applicant will hereinafter, in connection with other illustrations, which are of special interest, show and explain several other valve arrangements and other means, producing cooling-gas circulation.

The type of the valves shown, is of the commonly known flapper-valve type, which operate almost instantaneously, at very slight overpressure. Any known, convenient, automatic control of cooling-gas flow may be employed.

Referring to other novel constructional features, thin-walled cylindrical piston portions 44, are arranged between the piston top and the power piston wall portions containing the piston rings, thus more or less semi-heat-insulating these latter piston portions and the piston rings from the hot piston top. The effect of this semi-heat-insulation is heightened, by cooling gas-flow, at high velocity, through the narrow passage 44, formed between the thickened axially outer portions 45, of the inset and the thin-walled piston portions 44, as shown.

The expression cooling-gas is used herein, instead of cooling-air, which it implies, in order to clearly distinguish between cooling-gas used for internally cooling axially inner power cylinder portions and the power piston, as compared with cooling-air, preferably supplied from a different source (not shown herein), and employed for scavenging and internally air-cooling and for supercharging axially outer power cylinder portions which will now be explained.

An air-inlet port 46, is shown in Fig. 2, for admitting cooling-air into the power cylinder tangentially, preferably, at least partly axially outwardly of outer dead center piston position, as shown and explained more clearly in the above said previous application, for the purpose of scavenging and supercharging and primarily powerfully internally air-cooling the cylinder head and the axially outermost portions of the power cylinder. In order to accomplish this, applicant reasoned that the air-inlet port provided for the supercharged compression-ignition power unit, should pass through the axially outermost power cylinder wall portions in tangential and preferably axially outward direction, as shown and explained more fully in applicant's above mentioned co-pending application.

An automatically operated valve 47, shown in Fig. 2, controls the air-inlet port 46. The valve may be operated and timed, as shown and explained by applicant in his previous application, or it may be operated in any known, convenient manner. The arrow within the crankcase, indicates, that the piston is on its inward stroke, starting to uncover the combustion-gas overflow-port 48, shown in a dotted circle in Fig. 1 and shown in cross-section in Fig. 3. The port 48, may or may not be controlled by a valve 49, which latter may be operated similarly, as shown and explained in the writer's previous application, but timed in accordance with various purposes explained more fully hereinafter.

Aside from high thermodynamic losses, caused in non-supercharged, high-compression power units, by strong twirl, as explained by applicant heretofore, practical reasons have in the past prevented the use of a tangential air-inlet port terminating directly into axially outer portions of the combustion chamber. Such an inlet port ordinarily would cause large dead air space. Applicant reasoned, that with high supercharging, the dead air space can be kept relatively small. Furthermore, with applicant's extremely large volume of cool scavenging air, the cylindrical air-overflow valve and port are strongly cooled, preventing scorching or seizing of applicant's valve, at high supercharging and very high mean gas-temperatures and mean gas-pressures within applicant's power unit. For all of the above said reasons, applicant believes, that his novel construction is very important in connection with his original method of scavenging and internally air-cooling and supercharging primarily the axially outer portions of his compression-ignition, supercharged combustion chamber.

In his previous application, the writer has shown and explained a separate air compressor for supercharging and a separate low-pressure fluid-expansion power unit, permitting increased expansion of combustion products. It is not necessary to show this again, because the present invention relates specifically to a high pressure power unit, the latter preferably constituting an element of a highly supercharged, compound, internal combustion engine, as stated hereinbefore.

Referring now to the dotted lines 50 and 51, these latter lines indicate the outer and inner edges of the power piston 21, respectively, while the piston is in outer dead center position. As illustrated, the piston stroke is about two and one-half times as great as the power piston diameter and is about twice as great as the power piston length, the arrangement of the ports and of the cooling-gas passage, etc., being such, that the power piston permits overflow of cooling-gas through the port 48, while the piston approaches outer dead center position and while the inner edge 51, of the power piston, has uncovered the port 48. During axially inner piston positions, combustion products are over-flowing through the port 48, because the latter port is uncovered by the outer edge 50 of the power piston. As illustrated and explained, the large crosshead is drawing a large volume of cooling-gas into the cooling-gas passage 30 during the inward piston stroke. During the outward piston stroke, the cooling-gas, as stated hereinbefore, is slightly compressed within the annular cooling-gas passage 30 and is forced to flow through the relatively narrow, annular, axially outer portion of the cooling-gas passage 30, from where a portion of this cooling-gas flows through the perforation 32 and through the remaining cooling-gas group, as explained hereinbefore, strongly internally cooling the power cylinder and the power piston, during the entire outward piston stroke. It is evident, from the illustration and from the above explanations, that if the valve 49 is open at certain piston positions during outward piston stroke, a portion of the cooling-gas, simultaneously also flows from the narrow annular portion of the passage 30, through the port 48 and through the valve 49, Fig. 3, thus providing intermittent cooling of the latter port and valve, by means of cooling-gas, in addition to the intermittent cooling provided therein by cooling-air, during scavenging.

If it should be preferable to solely internally cool a greater portion of the power cylinder and to internally cool the power piston more efficiently by the cooling-gas, this can be accomplished, by closing the valve 49, after scavenging and internal air-cooling of the axially outer power cylinder portions, during outward piston stroke, has been completed, as fully explained by applicant, in his previous above said patent application, and by maintaining the valve 49 closed, until shortly before the overflow of the combustion products through the port 48, starts again. If the valve 49 is operated in this manner, practically all cooling-gas is forced to flow through the perforations and through the power piston. Again, the arrangement may be such, that the valve 49 may remain open, until the piston reaches about outer dead center position, whereupon the valve may be closed and may remain closed during a portion of the inward piston stroke, to be reopened again, before the piston top uncovers the port 48, during the inward piston stroke. This would prevent return flow, of more or less heated exhaust gasses, from a low-pressure power unit, through the port 48, into the cooling-gas passage, during beginning of the inward piston stroke. It is obvious to a mechanic versed in the art, that the timing of the valve, must depend on various circumstances, which need not be further explained herein.

Referring to the general construction of the power unit, the step piston, which consists of the power piston, the middle piston portions of lesser diameter than the power piston and the cylindrical crosshead of preferably larger diameter than the power piston, in combination with the peculiar, novel arrangement of the perforations, as shown and explained hereinbefore, together, are of great importance, producing more efficient and more uniform internal power cylinder cooling than has been possible heretofore, during a large portion of a piston stroke.

The large diameter crosshead, permits the use of a relatively very long power piston stroke, in connection with a relatively long power cylinder of small diameter. The long piston stroke, is facilitating internal cooling of a large portion of the power cylinder, first, by permitting scavenging- and cooling-air to enter into the power cylinder, preferably tangentially, adjacent to the power cylinder head, forcing a large volume of cooling-air, only slightly mixed with $CO_2$ gases, to flow spirally axially inwardly through the power cylinder, cooling the cylinder internally and escaping through the port 48 during the scavenging period, while successively, a large portion of the power cylinder, is again internally cooled by cooling-gas, which is forced to flow axially outwardly through the narrow annular portion of the cooling-gas passage 30, at high velocity, closely alongside a large portion of the internal power cylinder surface, escaping also through port 48. In this manner a large portion of the power cylinder, as shown and explained, is very uniformly and strongly internally cooled, twice, during each crankshaft revolution, the power cylinder being efficiently internally cooled throughout its entire length. This is only possible, if the piston stroke is considerably longer than the power piston and if the cooling-gas or cooling-fluid passage, as shown, is at least approximately as long as the piston stroke. In connection herewith, it is necessary to realize, that an ordinary piston stroke, can not be used in connection with high supercharging, for the following additional important reasons. Fuel must be injected relatively late and very gradually into the highly supercharged power unit, for reasons which have been fully set forth by applicant heretofore. It is evident, that at high supercharging, a relatively very large volume of air is compressed and a relatively very large amount of fuel is injected into the power cylinder of small diameter. The piston stroke should be sufficiently great, to permit substantially complete combustion and sufficient expansion and cooling of the combustion products, to prevent burning of the edges of the overflow port and of the axially outer piston edge and of the overflow valve 49, if the latter should be required under the circumstances. The manner of internally air-cooling the axially outer power cylinder portions, has been fully treated in the writer's previous application and has been mentioned hereinbefore Applicant will hereinafter discuss internal power cylinder and power piston cooling more fully.

Experience has shown, that in a highly supercharged power unit, designed for and operating under somewhat similar conditions as within applicant's power unit, wherein a power piston is entirely free of side-thrust, extremely high mean gas pressures and high mean gas temperatures, are permissible, at extremely high piston speed, practically without causing measurable wear and tear of the high pressure power cylinder and piston rings, provided the power cylinder is very efficiently internally air-cooled. The result of the above experience, encouraged applicant to advance further in this line of development.

Referring specifically to applicant's novel, important, internal cooling method, it should be understood, that internal heating and internal cooling of the combustion chamber wall surfaces, are very largely the result of extremely intense, instantaneous heat-ray action, which latter increases with the fourth power of the temperature differences between the metal surfaces and the combustion gas, while, on the contrary, the internal cooling of axially inner power cylinder wall surfaces and the internal cooling of the power piston, except the pistontop are taking place at relatively much lower temperatures and are almost exclusively the result of heat-convection. For this reason, it is essential, that applicant's method of internal cooling, by means of cooling-gas, must be, as nearly as possible, in conformance with the laws of heat-convection, which require, that a large amount of cooling-gas, at relatively low temperatures, must flow, at high velocity, very closely alongside the internal power cylinder wall surface and alongside the internal power piston wall surface. It is evident, that the internal cooling, by cooling-gas, as set forth and explained herein, is very efficient, because it is in strict accordance with the laws of heat-convection.

It is also evident, as stated, that in applicant's present construction, the greater portion of applicant's power cylinder wall-surface, is almost instantaneously, very efficiently, internally cooled, twice, during each crankshaft revolution, successively, before and after each combustion period, which is novel and important.

Applicant will now more clearly set forth and explain his basic reasons, for strongly internally cooling the axially inner portions of the power cylinder and the power piston, which necessitated his far reaching present reconstruction of his greatly supercharged high pressure power unit.

Experience has shown, that most of the trouble in internal combustion engines, is caused by carbonizing of the lubricant within the piston grooves. The grooves act as lubricant containers, receiving and supplying minute amounts of lubricant, during the reciprocating piston action. During each crankshaft revolution, a few drops of lubricant, are sucked into the very narrow spaces provided between the rings and the power piston grooves, the grooves and the rings, together, acting as a lubricant pump. A minute amount of lubricant is squeezed out at one side of each piston ring and a similar amount of fresh lubricant is sucked in at the opposite side of each piston ring, during each reverse of the piston stroke. The lubricant which is squeezed out, is distributed very uniformly at the cylinder wall surface, in form of an extremely fine film of oil, during each piston stroke. The more perfectly cylindrical the power cylinder and the piston rings and the more uniform the narrow clearance spaces, provided at each side of the piston rings, are, the more uniform is the lubricant pumping action and the more uniform is the distribution of the lubricant. The manner in which the fresh lubricant is supplied, by means of a separate high-pressure lubricant pump, has not been shown herein, because it is universally known and has nothing to do with the present invention. The main object of the present invention, is, to keep the surfaces, contacting with the lubricant, at as low temperatures as possible and to maintain the piston rings and the lubricant within the piston grooves, below the critical temperature, at which the lubricant would otherwise carbonize. If the lubricant within the small reservoirs, formed between the rings and the grooves, is kept below these critical temperatures, an engine may run for a reasonable time period, even if lubricant supply from without is temporarily insufficient, or momentarily stops, as a result of oversight of the operator, or for other reasons. If the lubricant, within this small reservoir, on the contrary, becomes partly decomposed or carbonized, as a result of overheating, the efficiency of the lubricant is reduced, causing wear and tear and finally seizure of the rings. These difficulties increase rapidly with supercharging. Applicant therefore became convinced, that in connection with high supercharging, it is not only essential, to strongly, uniformly, internally air-cool the axially outer power cylinder wall portions, but that it becomes almost equally important, to uniformly, strongly, internally cool the axially inner portions of the power cyinder and the power piston, in connection with practically all power unit sizes.

Recently it has become more common practice, in connection with high-compression, high-speed, power units, to externally cool the power cylinders, even of relatively small power units, throughout the entire power cylinder length. However, internal power cylinder surface cooling, of the axially inner power cylinder portions, such as recommended herein by applicant, is novel and very important, because it is far more reliable and efficient and practically instantaneous, while external cooling, through the cylinder walls, is relatively very slow and insufficient, at extreme heat-conditions, such as prevail within highly supercharged engines.

As a result of heat-convection, the closely contacting piston rings absorb heat from the relatively hot axially outer power cylinder wall surface, momentarily cooling the latter skin-deep, while the piston ring surface momentarily becomes hot skin-deep. The piston ring surfaces become momentarily cooled again, skin-deep, at or near axially inner power piston position, as a result of close contact with the axially inner power cylinder wall surfaces, which have meanwhile been momentarily cooled skin-deep, by cooling-gas. It is evident, from the above, that the piston rings act as efficient temperature equalizers, for the axially outer and axially inner power cylinder wall surfaces, during the reciprocating piston action. While this heat-equalizing action, as a result of heat-convection, as stated, produces mainly momentary, skin-deep heat transfer and surface-temperature moderation, this is nevertheless of great importance, because it permits the very fine lubricant oil film, which is formed and which is essential for proper operation, to exist during a sufficiently long time period, thus facilitating easy sliding of the piston rings, reducing friction and greatly increasing the life of the piston rings and of the power cylinder, during otherwise extremely severe internal heat conditions.

An oil-bath strainer, or the like, of known, convenient construction, (not shown), such as commonly used for purifying air, sucked into power cylinders, should also be employed in connection with the cooling-gas, used for internal cooling, in order to assure clean cooling-gas at all times. If this precaution is taken, applicant's cooling-gas method, offers an ideal, absolutely reliable means, for uniform, efficient, internal cooling, of the power cylinder and of the power piston.

Referring now to the other novel, important features of applicant's invention, the cylinder head 52, as illustrated, is interiorly and exteriorly conical. It is interiorly strongly air-cooled, as explained by applicant heretofore and it is exteriorly uniformly fluid-cooled, as will be explained hereinafter. The head may be ground gas-tight to the cylinder. The axially outer end portion of the head as shown, has a conical bore 53. A spray valve mechanism 54, has a taper axially inner end portion, fitted and ground into the conical bore. A fuel-inlet port, not shown, passes through the spray valve mechanism and through the cylinder head, terminating into the compression or combustion-chamber of the power unit at 55, Fig. 1a. The valve mechanism is pressed fuel-tight into the bore, by pressure of the flange 57. As shown, the cylinder head 52 is pressed gas-tight onto the cylinder, solely by the pressure exerted on the spray valve, by the flange 57, the latter being forced down by studs and nuts, as shown in Fig. 1a, or in any other convenient manner. As illustrated, the studs are fastened in the guide 56 for the spray valve mechanism 54. The guide is screwed into an extension of the casing 29, as shown in Fig. 1. It is essential, that the taper portion of the valve mechanism, is accurately, axially in line, with the taper bore within the cylinder head, while being ground-in tight and while the engine is in operation. This is accomplished by the guide 56, which is screwed into the extension of the main power unit casing and which is accurately guiding the spray valve mechanism. If the thread within the main casing and the bore within the cylindrical crosshead slide, are cut and finished during one setting on a machine tool, they will be perfectly co-axial. This applies also to the outwardly threaded power cylinder 22 and to the power cylinder bore, as well as to the outwardly threaded guide 56 and to its bore, all of which must be co-axial and perfectly aligned with each other.

As illustrated, the guide 56, has an axially inner, interiorly conical extension 58, providing a constricted annular cooling-fluid space 59, between the exteriorly conical cylinder head and the interiorly conical extension.

The objects of the above arrangement, as shown and explained, are, to cause very uniform pressure and strain on the cylinder head, non-existence of which heretofore caused cracking of cylinder heads. Applicant, on the contrary, produces a uniformly tight cylinder head grip, solely between the spray valve mechanism and the power cylinder which is novel, producing perfectly uniformly fuel-tight and gas-and air-tight joints, the cylinder head being of such a shape, that it can be made of forged steel, if desired and can withstand extremely severe heat, without danger of cracking or of being deformed or burned. A further purpose of the construction is, to completely surround the cylinder head with cooling-fluid, flowing at increasing velocity, through the contracted space 59, closely alongside the entire external surface of the cylinder head, the cooling-fluid being particularly deflected against the exterior surface of cylinder head portions, which are internally in contact with liquid fuel, thus preventing pre-gasifying of the fuel, before the latter enters into the combustion-chamber, which is important, for perfect control of fuel-injection, fuel-penetration and fuel-distribution, throughout the combustion-chamber. The uniform, powerful, interior and exterior cooling of the cylinder head, add considerably to the safety and efficiency of a highly supercharged power unit. Forced cooling-fluid circulation is preferable. Cooling-fluid may enter into the main casing, at 60 and may exit at 61.

Figures 4, 5, 7, 8, 9, 10, 11:
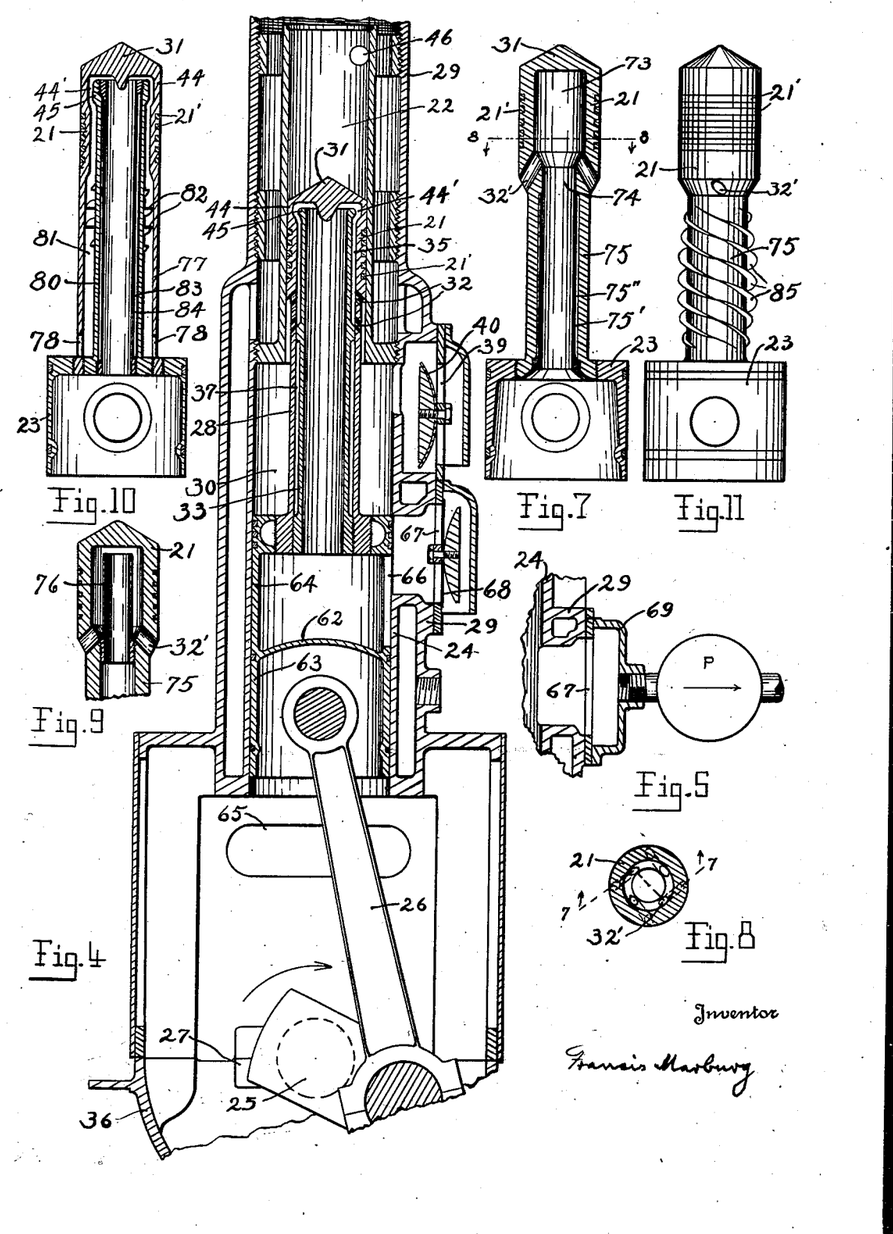
Fig. 4 is a vertical cross-section through another power-unit, embodying additional novel features.
Fig. 5 is a vertical cross-section, of a small portion of the main casing, shown in Fig. 4, illustrating a cooling-gas outlet-port and showing a cooling-gas pump connected thereto.
Figs. 7 and 8, respectively, show a cross-section on line 7—7 of Fig. 8 and a horizontal cross-section on line 8—8 of Fig. 7, of a novel power piston, which may be used in connection with the power unit, shown in Fig. 1.
Fig. 9 is a vertical cross-section of axially outer piston portions, showing novel features, which will be explained.
Fig. 10 is a vertical cross-section of a power piston, showing other novel features.
Fig. 11 is an elevation of the piston shown in Fig. 7, having spiral blades or fins, arranged on the middle piston portions, for reasons explained hereinafter.

Referring now to Fig. 4, this construction differs from the one shown in Fig. 1, because the crosshead, herein, is subdivided by a partition wall 62, into an axially inner crosshead portion 63, containing the crosshead pin and into a hollow axially outer crosshead portion 64, the latter communicating with the hollow inset and with the hollow power piston, as heretofore, while having no communication with the crankcase, which latter, as shown, may be of plain, open construction, communicating with the atmosphere by way of the port 65. The hollow cylindrical, axially outer crosshead portion 64, has a separate opening 66, communicating with a cooling-gas outlet port 67, which, as shown, passes through axially middle portions of the crosshead slide 24, the latter port being controlled by the valve 68. The remaining features of the construction, are substantially as shown and explained in connection with Fig. 1.

The operation is as follows: During the entire inward piston stroke, cooling-gas is sucked into the cooling-gas passage 30, while the cooling-gas inlet valve 40 is wide open and while the cooling-gas outlet valve 68 is closed, as shown, thus preventing any and all return flow of cooling-gas. During the outward piston stroke, the valve 40 is closed and the valve 68 is opened, cooling-gas, at first, overflowing mainly directly from the cooling-gas passage 30 into and through the valve-controlled outlet port 67 and into the atmosphere. After the crosshead has cut off direct communication between the passage 30 and the outlet port 67, the remaining cooling-gas is forced to flow from the passage, exclusively through the perforations, the clearance space, the hollow inset, the hollow crosshead portion 64 and from there through the opening 66 and through the valve-controlled outlet port 67, internally cooling the power cylinder and the power piston, while avoiding heated cooling-gas from getting into direct contact with the axially inner crosshead portion 63 and the crankcase, causing less heating of all bearings and of the inner crosshead portions, which latter absorb most of the side-thrust. For the above reasons, the crosshead construction, shown in Fig. 4, is preferable in connection with very high supercharging. In the construction, shown in Fig. 4, it is essential, that the cooling-gas inlet port 39, is automatically controlled, either by a suction or by a discharge valve, producing circulation of cooling-gas, either mainly in the one direction or mainly in the other direction, for the purpose of causing internal cooling of the power cylinder and of the power piston. If only the port 39 is automatically controlled, some of the heated cooling-gas flows back through the group, during the reciprocating piston action. If both ports are automatically valve-controlled, no return flow of cooling-gas through the group occurs, because the crosshead displaces and pumps the cooling-gas which flows through the group, only at its axially outer end, while, on the contrary, the crosshead in Fig. 1, displaces and pumps the cooling-gas flowing through the group, at each crosshead end. It is also evident, as explained already in connection with Fig. 1, that if the port 39 would be controlled by an outlet valve, instead of by an inlet valve, as shown herein, and if the port 67 would be controlled by an inlet valve, instead of by an outlet valve, as shown herein, the cooling-gas currents would be completely reversed, producing nevertheless efficient internal cooling of the power cylinder and of the power piston, under certain conditions, explained hereinbefore, provided, a sufficiently large amount of cooling-air, is circulated through the group.

Fig. 5 represents a small portion of the main casing, adjacent to the port 67, of Fig. 4. Instead of having a valve-controlled port 67, as shown in Fig. 4, a closed additional casing 69, is shown, secured to the main casing in some convenient manner, not shown. A suction cooling-gas pump is connected with this casing 69, producing a steady partial vacuum within portions of the group, causing steady, uninterrupted cooling-gas currents through the narrow cooling-gas passage and the hollow piston, etc., solely in one direction, during the reciprocating piston action. With this latter arrangement, the valve 40 should also be left out and the inlet port 39 should be permanently wide-open. Instead of a suction pump, as shown herein, which may be driven in any known convenient manner, any known convenient means may be employed producing, steady, uninterrupted cooling-gas circulation through the group, in either the one or the other direction. Applicant claims means producing substantially uninterrupted circulation of cooling-gas throughout the group.

Figure 6:
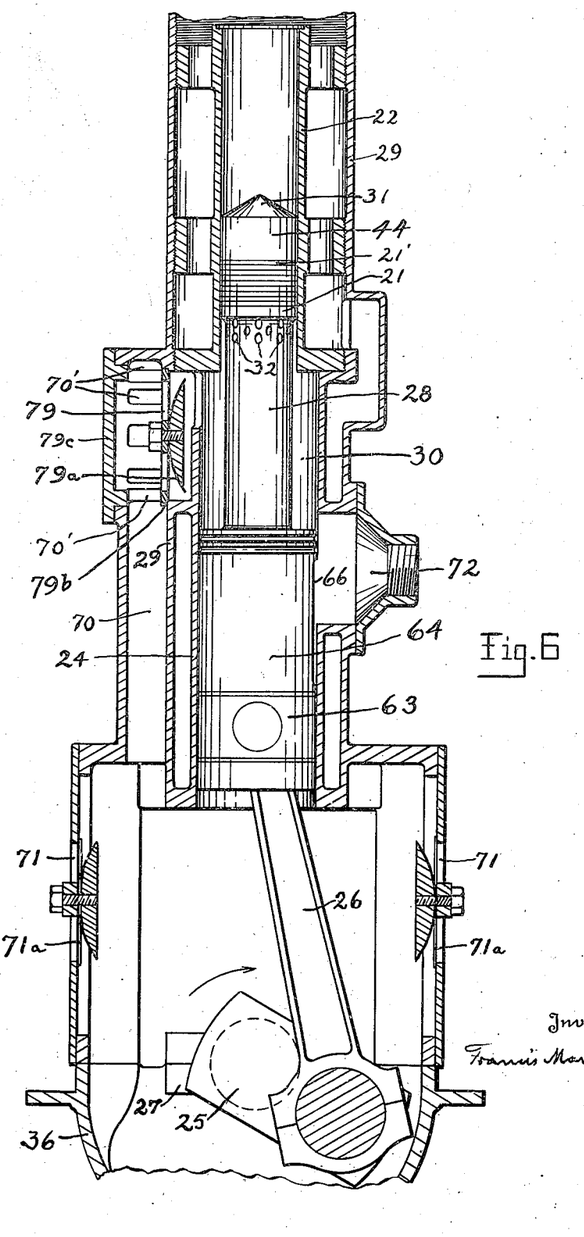
Fig. 6 illustrates a vertical cross-section of another power unit, embodying still other novel features.

Referring now to Fig. 6, this illustration differs from Figs. 1 and 4, because the crankcase 36, communicates with the passage 30, by way of ports 70 and 70' and by way of the inlet port 79, controlled by the valve 79a, all of these latter ports being arranged in series between the crankcase and the passage 30. As shown, the hollow cover 79c, contains a plurality of ports 70'. The valve or valves 79a, are attached to the plate 79b, as shown, in known manner. This latter plate is gripped between the cover 79c and the casing 29. As furthermore illustrated, the crankcase is of closed type, containing 2 inlet ports 71, which are automatically controlled by the inlet valves 71a. The latter piston is shown in elevation, because it is identical with the piston shown in Fig. 4. The action is as follows: During the inward piston stroke, the valves 71a, as shown, are closed and the valve 79a, as shown, is open. As a result of the very large axially inner crosshead displacement within the crankcase, a volume of cooling-gas, being approximately twice as great as the cooling-gas passage capacity, is forced to flow from the crankcase through the ports 70 and 70' and through the port 79 and the valve 79a, into the passage 30. It is evident, that during this inward piston stroke, approximately half of the large volume of cooling-gas, displaced within the crankcase, must flow through the piston perforations and through the hollow power piston, etc., as shown and explained hereinbefore in connection with Fig. 4, producing internal cooling of the power cylinder and of the power piston. During the outward piston stroke, the axially outer crosshead displacement forces the cooling-gas, which is still contained within the cooling-gas passage, to flow from the latter through the perforations and through the hollow piston, etc., producing additional internal cooling of the power cylinder and of the power piston, during each piston stroke, heated cooling-gas, escaping through the separate opening 66, provided within the hollow crosshead portion, as explained hereinbefore, in connection with Fig. 4, and through the open port 72. It is evident, that approximately continuous cooling-gas circulation and internal cooling are produced. The crosshead displacement, within the crankcase, is very large and the action is positive and is accomplished, with relatively small expenditure of energy, because considerably less cooling-gas pressure is required, for circulating a given volume of cooling-gas at practically continuous flow, through the passage and perforations, etc., instead of circulating the same amount of cooling-gas during a single piston stroke. The construction shown in Fig. 6, therefore contains novel features, which are an improvement over the constructions shown hereinbefore. Instead of being arranged to act as air-inlet valves, as illustrated, the valves 71a and 79a, could instead be arranged to act both as air-outlet valves, which would completely reverse the cooling-air flow throughout the group. The illustrated valve arrangement, produces primarily efficient internal power cylinder cooling, while the reverse cooling-air flow would produce primarily internal power piston cooling.

Referring now to Figs. 7 and 8, the perforations 32', terminate tangentially and in axially outward direction, into a large bore or hollow 73, provided within the power piston, causing cooling-gas to enter therein spirally and axially outwardly, the cooling-gas, at first, clinging more or less to the internal power piston wall surface, because of centrifugal force, internally cooling the power piston, before flowing radially and axially inwardly and escaping through the small bore or hollow 74, provided within the middle piston portions 75. The tube 75', within the middle piston portions is semi-heat-insulated from the middle piston portions, in order to prevent undue pre-heating of the outwardly flowing cooling-gas, before fulfilling its function of internally cooling power cylinder portions and the power piston portions, containing the piston rings. It is evident, from Figs. 7 and 8, that the power piston does not necessarily require an inset, such as shown in Figs. 1 and 4. However, in Fig. 9, the construction of a power piston has been shown in cross-section, containing perforations, which may enter into the large bore of the power piston, tangentially or otherwise, the power piston having a hollow inset 76, forcing all of the cooling-gas to flow to the axially outermost end of the large bore, before the cooling-gas can escape axially inwardly, through the hollow inset. The pistons shown in Figs. 7, 8, 9, 10 and 11, are practically interchangeable with the piston shown in Fig. 1, without other changes in the construction.

Referring now to Fig. 10, the piston shown herein, is different from the pistons shown heretofore, the middle piston portions 77, being of the same diameter as the power piston, having perforations 78, adjacent to the crosshead 23, instead of adjacent to the power piston 21. As shown heretofore, the middle piston portions are screwed into the crosshead and an inset 80 is screwed into the middle piston portions, the inset, as shown, extending throughout the entire length of the middle piston portions and through the power piston, leaving a clearance space 81 between the inset and the hollow piston, a large volume of cooling-gas being forced to flow throughout this clearance space during the entire outward piston stroke, as a result of the pumping action of the crosshead, as explained hereinbefore. As shown, the inset has spiral plates 82, attached thereto, producing cooling-gas twirl within the power piston, the purpose of this construction, being, to compel the cooling-gas to flow internally, closely alongside the power piston portions, spirally axially outwardly for a greater total distance and at higher velocity, producing more efficient internal cooling of the power piston walls and of the piston top, before escaping through the hollow inset and the crosshead. It will furthermore be seen, that a tube 83, extends throughout the entire length of the inset and that a heat-insulating space 84, is provided between the tube and the inset, preventing outwardly flowing cooling-gas, from becoming unduly preheated, before fulfilling its function of internally cooling the power piston. Fig. 11 is an elevation of the piston shown in Fig. 7, except, that a number of spiral blades 85, are arranged on the middle piston portions, producing spiral movement of the cooling-gas, alongside the internal power cylinder wall surface, increasing cooling of the latter.

From the specification and drawings, it becomes obvious to a mechanic versed in the art, that, in connection with very high supercharging, the crosshead and guide preferably should be of relatively very large diameter, while in connection with lesser supercharging, the diameter of the crosshead and guide, preferably is reduced correspondingly, because less internal cooling is required and less mean side-thrust and wrist-pin pressures are produced. With moderate supercharging, the power piston and crosshead may be of the same diameter and the piston stroke may be shorter, in comparison with the power piston diameter, producing a continuous cylinder and a cooling-gas passage of uniform, radially outer and radially inner diameter, provided the other constructional features, remain, as shown and explained, in connection with Fig. 1. Such a crosshead would continue to pump cooling-gas at its axially inner end. If, in connection with this latter crosshead, a separate pressure cooling-gas pump, of the type indicated in Fig. 5, or of any known convenient centrifugal or turbine pump, or the like, would communicate with the cooling-gas passage, substantially uninterrupted cooling-gas, or cooling-fluid circulation through the group, would be produced. This has not been especially shown, because applicant has shown and explained hereinbefore several novel constructions, producing substantially uninterrupted flow of cooling-medium throughout the group.

In conclusion, the problems and the scope of the invention, can be best understood, by comparing the amount of pure air, compressed within a non-supercharged 2 cycle power unit, with the amount of pure air compressed within a highly supercharged 2 cycle power unit of same power piston displacement. Assuming, for example, the total power piston displacement, in each case, to be 100 cbi., we may reasonably assume, that a fairly well scavenged, non-supercharged, 2 cycle power unit, during compression, contains only about 50 cbi. of pure air, measured at atmospheric pressure and atmospheric temperature, besides containing a considerable amount of $CO_2$ and other non-combustible gases, partly because of imperfect scavenging, partly because the gas- and air-temperature is considerably higher than atmospheric temperature at the beginning of compression and partly as a result of belated closing of the exhaust port during the compression stroke. Comparing herewith the contents of pure air within applicant's 2 cycle power unit compression-chamber, partly, as a result of super-scavenging, as we may call it, with a very large over-amount of cool air, flowing spirally inwardly through the power cylinder and moreover as a result of successive supercharging with an additional volume of pure air, equalling for example, the power piston displacement at atmospheric pressure and temperature, (which we may call 100 per cent supercharging), it becomes evident, that applicant's compression-chamber, roughly speaking, contains three times as much pure air, as a non-supercharged power unit, or about 150 cbi. of pure air, measured at atmospheric pressure and temperature. With 200 per cent supercharging, applicant's compression-chamber contains about 5 times as much pure air, as a non-supercharged power unit of the same power piston displacement, which means, that from 3 to 5 times as much fuel should be injected and burned, during each power stroke, producing from 3 to 5 times as many B. t. u., as in the non-supercharged power unit. Applicant's mean temperatures and M. I. P. will be considerably more than 3 to 5 times as high, up to the moment of opening of the combustion products outlet port, because heat-absorption and heat-conduction losses, in applicant's power unit, are relatively much lower, than within a non-supercharged power unit, as explained by applicant heretofore.

The above statements are borne out by experimental tests, made in a leading manufacturing concern for large marine Diesel engines, wherein 15 per cent supercharging, at otherwise identical conditions, increased M. I. P. 25 per cent. In other commercial power units, 50 per cent supercharging, increased M. I. P. about 100 per cent.

The crucial problem, therefore, as stated already in the writer's previous application, is, to avoid dangerous temperatures and pressures, within the combustion chamber. Applicant, originally, clearly set forth and explained these problems, which heretofore were hardly mentioned by inventors of highly supercharged, compound engines. Applicant proposed to inject a large amount of fuel into the relatively very small high pressure power cylinder, late and very gradually, employing more highly compressed air, resulting in greater air-density and higher air-temperature, than proposed heretofore, using an extremely compact, preferably conical-cylindrical compression-or combustion-chamber, wherein powerful air-and gas-twirl, can be produced and maintained, preferably during the entire fuel injection-and combustion-periods, causing almost instantaneous breaking up, gassifying and mixture of fuel and air, producing ignition and combustion substantially as quickly as fuel is injected. Accumulation of fuel, during beginning of injection, as stated, is almost entirely avoided, substantially preventing explosion and producing a smooth running high-speed power unit. All of this is only attainable, in connection with a highly supercharged power unit, wherein a pancake- or irregular-shaped compression-or combustion-chamber, can be avoided, even at extremely high compression.

As stated, applicant's main object, is, to create a highly supercharged, compression-ignition power unit, wherein M. I. P. and mean gas temperatures, are several times as high as in non-supercharged power units, which is essential for compounding, in the manner as set forth and explained in applicant's above said co-pending application, producing smoothly operating, perfectly carbon-free highpressure-and lowpressure-power units, in a compound engine requiring only about one half the amount of fuel per I. H. P., as non-compound compression-ignition engines. Compounding of steam engines, as stated, has revolutionized steam engine construction during past generations. Modern internal combustion engines, as stated, employ many times as high M. I. P. and mean gas temperatures as the pressures and temperatures used in multi-expansion steam engines. Thermodynamically, there is every reason, why compression-ignition engines should be compounded. The greatest difficulty in compounding, as stated, heretofore, has been, to prevent scorching of axially outer combustion chamber walls and to prevent lubricant from carbonizing within the highpressure power piston grooves. These difficulties have been overcome by applicant, to a very high degree, first, by powerful internal cooling of the axially outer combustion chamber walls, secondly, by intermittent internal cooling of the axially middle power cylinder portions, twice, during each crankshaft revolution, thirdly, by internal cooling of the axially inner power cylinder portions and, fourthly, by internal cooling of the power piston wall portions containing the piston rings and by internally cooling the power piston top.

In addition, applicant has recommended radical changes in the method of producing almost instantaneous combustion, whereby it becomes possible, to obtain more perfect control of maximum gas temperatures and maximum gas pressures, than possible heretofore.

While applicant's previous invention, referred to improvements in compound engines and to improved combustion and thermodynamic conditions and to improved fuel-economy, as well as referring to internal cooling of the high-pressure power unit combustion chamber, the present invention, as stated, refers again to powerful internal cooling of the axially outer power cylinder portions and in addition refers to stronger internal cooling of the axially middle power cylinder portions and to internal cooling of the axially inner power cylinder portions. The present invention, furthermore, refers to internal power piston cooling. All of this affects the piston ring- and lubricant-temperatures, improving lubrication facilities.

Furthermore, applicant made improvements in the construction of the power cylinder head, as fully explained hereinbefore.

As stated, engineers have heretofore carefully avoided using powerful, continuous air-twirl, or cooling-gas-twirl, because of the assumption, that thermodynamic efficiency, thereby, would be greatly reduced, which is more or less correct, depending however on circumstances, as explained by applicant. Nevertheless, as stated hereinbefore, the industry has been forced to employ moderate air-and gas-twirl, in order to maintain systematic turbulence, during the continuation of fuel-injection and combustion, because even moderate twirl, produces more uniform distribution of fuel, more perfect mixture of fuel and air and quicker combustion, with less excess of highly compressed air, which latter otherwise reduces M. I. P., increasing exhaust-heat-losses and increasing the size and cost, etc. of the power unit, per I. H. P. Applicant's original conclusions and his novel constructions, based thereon, as set forth and explained in his previous and in his present patent application, prove, that it is necessary and possible, in connection with a highly supercharged power unit, to use powerful, continued, air-twirl and cooling-gas-twirl, with relatively small heat losses per I. H. P.

In applicant's above mentioned co-pending application, the writer originally set forth and explained the crucial importance of primarily powerfully internally air-cooling the cylinder head and the axially outermost cylinder wall portions of a supercharged, compression-ignition power unit. In order to accomplish this result, the writer originally provided a scavenging-and supercharging-air inlet port, passing tangentially and preferably axially outwardly through cylinder wall portions adjacent to the head, producing powerful twirl of pure and cool scavenging-and supercharging-air. It is essential, that the power unit compression space be arranged concentrically with the cylinder axis and it should be in substantially non-restricted communication with the cylinder portions containing the power piston, in order to produce and maintain substantially non-interrupted twirl around the common axis of the compression space and cylinder, during scavenging, supercharging, compression, fuel injection, gasification and combustion, all of which is essential for the proper operation of applicant's power unit. The above mentioned novel features are fully set forth in applicant's co-pending application and they are also employed in his present novel, important construction and are broadly claimed by him.

In non-supercharged compression-ignition, fuel-injection power units, compression of more than 16 to 1, has not been found advisable and has not been used heretofore in practice, because of excessive heat-absorption and heat-conduction losses, produced in pancake-or irregular-shaped compression spaces and combustion chambers. Applicant has heretofore fully set forth and explained, that heat conditions in non-supercharged power units, are totally different from heat conditions produced within properly constructed highly supercharged power units and that these latter power units, for reasons set forth and explained by the writer heretofore, require considerably higher compression than non-supercharged power units. For the above reasons, applicant claims compression of 20 to 1 more or less in connection with his novel construction.

It is evident, applicant provides extremely efficient, practically instantaneous, internal cooling, based on scientific principles. It furthermore is evident, that all novel, constructional features, of applicant's previous and of his present invention, co-operate with each other, in creating a more reliable and more efficient, more highly supercharged, compression-ignition, internal combustion power unit, than existed heretofore.

In connection with the claims attached hereto, applicant offers following additional definitions of expressions:

"Passage" may include one or a plurality of cooling-gas or cooling-fluid passages. The passage or passages, may extend spirally, or otherwise, axially, through portions of the power cylinder.

"Cooling-gas" in the specification and claims, means substantially fuel-free air or gases.

"Cooling-fluid" includes cooling-gases and cooling-liquid and cooling lubricant.

Cooling-gas and cooling-fluid may be pre-cooled, in known, convenient manner, not shown herein, before being circulated through the cooling-gas passage, etc., in order to more efficiently internally cool the power cylinder and the power piston, and in order to avoid circulating highly heated gas or fluid.

The expression "superscavenged," used in the specification and claims, means that a considerably greater cubic amount of pure air, at approximately atmospheric temperature and pressure, is forced to flow into the combustion chamber during scavenging, than the total power piston cubic displacement.

The expression "supercharged," as used in the specification and claims, means that in addition to super-scavenging, a considerable additional amount of pure air is forced to flow into the combustion chamber at greater than atmospheric pressure.

While my invention has been set forth and explained more particularly in connection with 2 cycle engines, I do not limit it's scope to this type of engine. I claim my invention, broadly, in connection with supercharged, compression-ignition, internal combustion engines.

Various changes in construction, may readily suggest themselves to a mechanic versed in the art and nothing contained herein, is intended, to imply in any manner, that applicant is limiting himself to the constructions shown and to the combinations described herein, except as claimed.

I claim:

1. An internal combustion power unit of the supercharged compression-ignition type having a power cylinder, a cylinder head and a piston, the power unit having an automatically controlled air-inlet port for purposes of scavenging and internally air-cooling and supercharging with substantially pure air, the power unit having a fuel inlet port terminating into the compression chamber, the power unit having a power piston controlled outlet port for combustion products, axially outer portions of said piston serving as a power piston containing piston rings sliding snugly within said power cylinder, axially inner portions of said piston being of greater diameter than said power piston and having a wrist pin and serving as a cylindrical crosshead, a cylindrical guide for said crosshead, said guide being connected with said power cylinder and arranged coaxially with and axially inwardly therefrom, a crankcase having a cooling-gas port communicating therewith, a crankshaft and a crankshaft bearing, a connecting rod driven by said crosshead and driving said crankshaft, the piston stroke being twice as great, more or less, as the power piston diameter, said guide and said crosshead absorbing the side-thrust caused by said connecting rod and acting as a cooling-gas pump, axially middle portions of said piston and the internal cylindrical surfaces of axially inner portions of said power cylinder and of axially outer portions of said guide and the axially outer surface of said crosshead and the axially inner surface of said power cylinder, together, forming a cooling-gas passage, the power unit having a second cooling-gas port, said latter port communicating with said cooling-gas passage, said piston being hollow except at its top, the wall of said piston being perforated adjacent to said power piston, at least one of the said cooling-gas ports being automatically controlled, the arrangement being such that the cooling-gas port communicating with said passage, the said passage, the said perforation, the hollow within said piston, the crankcase and the cooling-gas port communicating therewith, together, are forming a group and are in series and in communication with each other during at least half of a piston stroke, the said cooling-gas-control causing a considerably greater amount of cooling-gas to flow through said group in one direction than in the opposite direction during the reciprocating action of said piston.

2. A structure as in claim 1, wherein the total peripheral width of the said cooling-gas passage at the internal power cylinder wall surface is equal to the periphery at said latter wall surface.

3. An internal combustion power unit of the supercharged compression-ignition type having a power cylinder, a cylinder head and a piston, the power unit having an automatically controlled air-inlet port for purposes of scavenging and internally air-cooling and supercharging, the power unit having a fuel inlet port terminating into the compression chamber, the power unit having an automatically controlled outlet port for combustion products, axially outer portions of said piston serving as a power piston containing piston rings sliding snugly within said power cylinder, axially inner portions of said piston being of greater diameter than said power piston and serving as a cylindrical crosshead, a cylindrical guide for said crosshead, said guide being connected with said power cylinder and arranged co-axially with and axially inwardly therefrom, a crankcase, the power unit having a cooling-gas port communicating with said crankcase, a crankshaft and a crankshaft bearing, a connecting rod driven by said crosshead and driving said crankshaft, said guide and said crosshead absorbing the side-thrust caused by said connecting rod and acting as a cooling-gas pump, axially middle portions of said piston and the internal cylindrical surfaces of axially inner portions of said power cylinder and of axially outer portions of said guide and the axially outer surface of said crosshead and the axially inner surface of said power cylinder, together, forming a cooling-gas passage, the power unit having a second cooling-gas port, said latter port communicating with said passage, said piston being hollow except at its top, the wall of said piston being perforated, at least one of the said cooling-gas ports being automatically controlled, the arrangement being such that the cooling-gas port communicating with said passage, the said passage, the said perforation, the hollow within said piston, the crankcase, and the cooling-gas port communicating therewith, together, are forming a group and are in series and in communication with each other during at least a portion of a piston stroke, the total peripheral width of said passage at the internal power cylinder wall surface being equal to at least one-half of the periphery at said latter wall surface, the said cooling-gas-control causing a considerably greater amount of cooling-gas to flow through said group in one direction than in the opposite direction during the reciprocating action of said piston.

4. A structure as in claim 3, wherein the space within said hollow power piston is subdivided by a tubular conduit into a substantially annular radially exterior passage communicating with said perforation and into a radially interior passage communicating at its axially outer end adjacent to said piston top with said exterior passage and communicating at its axially inner end with said crankcase by way of said hollow crosshead.

5. A structure as in claim 3, wherein said middle piston portions are of lesser diameter than said power piston and wherein a spiral blade is arranged on said middle piston portions producing a spiral passage between said middle piston portions and the internal cylindrical surface of axially inner portions of said power cylinder, the said cooling-gas-control causing cooling-gas to flow through said passage at a greater axially outward speed than the power piston speed during a piston stroke, producing spiral movement of the cooling-gas alongside said spiral blade and alongside the internal power cylinder surface.

6. A structure as in claim 3, wherein the hollow within said power piston is of larger diameter than the hollow within said middle piston portions, means forcing cooling-gas to flow from said passage through said perforation into said large hollow tangentially and axially outwardly, producing spirally outward movement of at least a portion of the cooling-gas within said large hollow, before the cooling-gas escapes through the smaller hollow within said middle piston portions and through said crosshead and said crankcase.

7. A structure as in claim 3, wherein said middle piston portions are of lesser diameter than said power piston producing an annular cooling-gas passage, means producing spirally outward flow of cooling-gas through said passage and producing spirally outward flow of cooling-gas through at least a portion of said hollow power piston before the cooling-gas escapes axially inwardly through said hollow axially middle and axially inner piston portions and said crankcase.

8. A structure as in claim 3, wherein the space within said hollow power piston is subdivided by a tubular conduit into a substantially annular radially exterior passage communicating with said perforation and into a radially interior passage communicating at its axially outer end adjacent to said piston top with said exterior passage and communicating at its axially inner end with said crankcase by way of said hollow crosshead, said power piston having thinned annular wall portions extending between said piston top and the annular wall portions containing said piston rings, the cooling-gases flowing closely alongside and cooling the internal surfaces of the wall portions containing said piston rings and of the said thinned wall portions and of the said piston top.

9. An internal combustion power unit of the supercharged compression-ignition type having a power cylinder, a cylinder head and a piston, the power unit having an automatically controlled air-inlet port for purposes of scavenging and internally air-cooling and supercharging, the power unit having a fuel inlet port terminating into the compression chamber, the power unit having an automatically controlled outlet port for combustion products, axially outer portions of said piston serving as a power piston containing piston rings sliding snugly within said power cylinder, axially inner portions of said piston being of greater diameter than said power piston and serving as a cylindrical crosshead, a cylindrical guide for said crosshead, said guide being connected with said power cylinder and arranged co-axially with and axially inwardly therefrom, a crankshaft and a crankshaft bearing, a connecting rod driven by said crosshead and driving said crankshaft, said guide and said crosshead absorbing the side-thrust caused by said piston rod and acting as a cooling-gas pump, axially middle portions of said piston and the internal cylindrical surfaces of axially inner portions of said power cylinder and of axially outer portions of said guide and the axially outer surface of said crosshead and the axially inner surface of said power cylinder, together, forming a cooling-gas passage, the power unit having an automatically controlled cooling-gas port communicating with said passage, said piston being hollow except at its top and except at axially inner end portions of said crosshead, the wall of said piston being perforated, said crosshead being subdivided by a partition wall into an axially outer hollow crosshead portion communicating with the hollow within axially middle and axially outer portions of said piston and into an axially inner crosshead portion containing the wrist pin, said hollow axially outer crosshead portion having a separate cooling-gas opening, said power unit having a second cooling-gas port, said latter port communicating with said separate opening, the arrangement being such that the said cooling-gas port communicating with said passage, the said passage, the said perforation, the hollow provided within said piston, the said separate opening and the said second cooling-gas port, together, are forming a group and are in series and in communication with each other during at least a portion of a piston stroke, the said cooling-gas-control causing a considerably greater amount of cooling-gas to flow through said group in one direction than in the opposite direction during the reciprocating action of said piston.

10. A structure as in claim 9, wherein each of the said cooling-gas ports is automatically controlled, thus preventing return flow of heated cooling-gas through said group during the reciprocating action of said piston.

11. A structure as in claim 9, wherein the space within said hollow piston is subdivided by a tubular conduit into a substantially annular radially exterior passage communicating with said perforation and into a radially interior passage communicating at its axially outer end adjacent to said piston top with said exterior passage and communicating at its axially inner end with the said hollow axially outer crosshead portion.

12. A structure as in claim 9, wherein the space within said hollow piston is subdivided by a tubular conduit into a substantially annular radially exterior passage communicating with said perforation and into a radially interior passage communicating at its axially outer end adjacent to said piston top with said exterior passage and communicating at its axially inner end with said hollow axially outer crosshead portion, means being provided producing at least approximately continuous flow of cooling-gas axially through said cooling-gas passage and successively through said perforation and said exterior passage and said interior passage, substantially in series and in the above said sequence.

13. A structure as in claim 9, wherein the space within said hollow piston is subdivided by a tubular conduit into a substantially annular radially exterior passage communicating with said perforation and into a radially interior passage communicating at its axially outer end adjacent to said piston top with said exterior passage and communicating at its axially inner end with said hollow axially outer crosshead portion, said power piston having thinned annular wall portions extending between said piston top and the annular wall portions containing said piston rings, the cooling-gas flowing closely alongside of and cooling the internal surfaces of the wall portions containing said piston rings and alongside of the said thinned wall portions and the said piston top, means being provided producing at least approximately continuous flow of cooling-gas axially through said cooling-gas passage and successively through said perforation and said exterior passage and said interior passage, substantially in series and in the above said sequence.

14. An internal combustion power unit of the supercharged compression-ignition type having a power cylinder, a cylinder head and a piston, the power unit having an automatically controlled air-inlet port for purposes of scavenging and internally air-cooling and supercharging, the power unit having a fuel-inlet port terminating into the compression chamber, the power unit having an automatically controlled outlet port for combustion products, axially outer portions of said piston serving as a power piston containing piston rings sliding snugly within said power cylinder, axially inner portions of said piston being of greater diameter than said power piston and serving as a cylindrical crosshead, a cylindrical guide for said crosshead, said guide being connected with said power cylinder and arranged co-axially with and axially inwardly therefrom, a crankshaft and a crankshaft bearing, a connecting rod driven by said crosshead and driving said crankshaft, said guide and said crosshead absorbing the side-thrust caused by said connecting rod and acting as a cooling-gas pump, the axially middle portions of said piston and the internally cylindrical surfaces of axially inner portions of said power cylinder and of axially outer portions of said guide and the axially outer surface of said crosshead and the axially inner surface of said power cylinder, together, forming a cooling-gas passage, said power unit having an automatically controlled cooling-gas inlet port communicating with said passage, the length of the piston stroke and of said cooling-gas passage and the arrangement, being such, that towards the end of the inward piston stroke, the axially outer edge of said power piston uncovers said outlet port permitting combustion products to escape through said outlet port, while towards the end of the outward piston stroke, said passage communicates with said outlet port permitting cooling-gas to flow axially outwardly through said passage and through said outlet port, internally cooling said power cylinder and said outlet port.

15. A structure as in claim 14, wherein said piston is hollow except at its top, the wall of said hollow piston being perforated, said perforation communicating with said passage, a cooling-gas outlet port being provided emerging from within said hollow piston, the arrangement permitting a portion of the cooling-gas to escape through said perforation and through said hollow piston and said cooling-gas outlet port, a portion of the remaining cooling-gas escaping from said passage through said outlet port for combustion products, said cooling-gas-control causing a considerably greater amount of cooling-gas to flow through said passage in one axial direction than in the opposite axial direction during the reciprocating action of said piston.

16. A structure as in claim 14, wherein said outlet port for combustion products is automatically valve-controlled in such manner, that the valve within the said latter port is open towards the end of the outward piston stroke and is closed at about outer dead center piston position, said valve being reopened again shortly before the piston top uncovers said port during the inward piston stroke, the arrangement thus preventing return flow of combustion products through said outlet port into said passage during the inward piston stroke.

17. A structure as in claim 14, wherein said axially outer and said axially middle piston portions are hollow except the piston top, the wall of said axially middle piston portions being perforated, the space within said hollow piston portions being subdivided by a tubular conduit into a substantially annular radially exterior passage communicating with said perforation and into a radially interior passage communicating at its axially outer end adjacent to said piston top with said exterior passage, an outlet being provided for cooling-gases from axially inner portions of said interior passage, means causing a portion of said cooling-gases to flow from said cooling-gas passage through said outlet port for combustion products and causing a portion of said cooling-gases to flow from said cooling-gas passage through said perforation and said exterior passage and said interior passage and through the outlet provided therefor.

18. An internal combustion power unit of the supercharged compression-ignition type having a power cylinder, a cylinder head and a piston, the power unit having an automatically controlled air-inlet port for purposes of scavenging and internally air-cooling and supercharging, the power unit having a fuel inlet port terminating into the compression chamber, the power unit having an automatically controlled outlet port for combustion products, axially outer portions of said piston serving as a power piston containing piston rings sliding snugly within said power cylinder, axially inner portions of said piston being of greater diameter than said power piston and serving as a cylindrical crosshead, a cylindrical guide for said crosshead, said guide being connected with said power cylinder and arranged co-axially with and axially inwardly therefrom, a crankcase, the power unit having a cooling-gas port communicating with said crankcase, a crankshaft and a crankshaft bearing, a connecting rod driven by said crosshead and driving said crankshaft, said guide and said crosshead absorbing the side-thrust caused by said connecting rod and acting as a cooling-gas pump, axially middle portions of said piston and the internal cylindrical surface of axially outer portions of said guide and the axially outer surface of said crosshead and the axially inner surface of said power cylinder, together, forming an annular cooling-gas passage, the power unit having a second cooling-gas port which latter is communicating with said cooling-gas passage, said piston being hollow except at its top, the piston wall being perforated adjacent to said crosshead, the hollow within said piston being subdivided by a tubular conduit into a radially exterior passage and a radially interior passage, said exterior passage communicating with said perforation and extending axially outwardly alongside said piston wall to adjacent to said piston top where it communicates with said interior passage, the said interior passage communicating at its axially inner end with said crankcase by way of said hollow crosshead, at least one of the said cooling-gas ports being automatically controlled, the arrangement being such that the said cooling-gas port communicating with said cooling-gas passage, the said latter passage, the said perforation, the said exterior passage, the said interior passage, the hollow within said crosshead, said crankcase and said cooling-gas port communicating therewith, together, are forming a group and are in series and in communication with each other during at least a portion of a piston stroke, the total peripheral width of said cooling-gas passage at the internal power cylinder wall surface being at least half as great as the periphery at said latter surface, the said cooling-gas-control causing a considerably greater amount of cooling-gas to flow through said group in one direction than in the opposite direction during the reciprocating action of said piston.

19. An internal combustion power unit of the supercharged compression-ignition type having a power cylinder, a cylinder head and a piston, the power unit having an automatically controlled air-inlet port for purposes of scavenging and internally air-cooling and supercharging, the power unit having a fuel inlet port terminating into the compression chamber, the power unit having an automatically controlled outlet port for combustion products, axially outer portions of said piston serving as a power piston containing piston rings sliding snugly within said power cylinder, axially inner portions of said piston serving as a cylindrical crosshead, a cylindrical guide for said crosshead, said guide being connected with said power cylinder and arranged co-axially with and axially inwardly therefrom, a crankcase, the power unit having a cooling-gas port communicating with said crankcase, a crankshaft and a crankshaft bearing, a connecting rod driven by said crosshead and driving said crankshaft, said guide and said crosshead absorbing the side-thrust caused by said connecting rod, axially middle portions of said piston and the internal cylindrical surfaces of axially inner portions of said power cylinder and of axially outer portions of said guide, together, forming a cooling-gas passage, the power unit having a second cooling-gas port, said latter port communicating with said cooling-gas passage, said piston being hollow except at its top, the wall of said piston being perforated, a tubular conduit subdividing the space within said power piston into a radially exterior passage and a radially interior passage, said exterior passage communicating with said perforation, said interior passage communicating at its axially outer end adjacent to said piston top with said exterior passage and communicating at its axially inner end with the hollow within said crosshead and with said crankcase, the arrangement being such that said cooling-gas port communicating with said cooling-gas passage, the said cooling-gas passage, said perforation, said exterior passage, said interior passage, the hollow within said crosshead, the crankcase and said cooling-gas port communicating therewith, together, are forming a group and are in series and in communication with each other during at least a portion of a piston stroke, means being provided, causing a considerably greater amount of cooling-gas to flow through said group in one direction than in the opposite direction during the reciprocating action of said piston.

20. An internal combustion power unit of the supercharged compression-ignition type having a power cylinder, a cylinder head and a piston, the power unit having an automatically controlled air-inlet port for purposes of scavenging and internally air-cooling and supercharging, the power unit having a fuel inlet port terminating into the compression chamber, the power unit having an automatically controlled outlet port for combustion products, axially outer portions of said piston serving as a power piston containing piston rings sliding snugly within said power cylinder, axially inner portions of said piston serving as a cylindrical crosshead, a cylindrical guide for said crosshead, said guide being connected with said power cylinder and arranged co-axially with and axially inwardly therefrom, a crankcase, the power unit having a cooling-gas port communicating with said crankcase, a crankshaft and a crankshaft bearing, a connecting rod driven by said crosshead and driving said crankshaft, said guide and said crosshead absorbing the side-thrust caused by said connecting rod, axially middle portions of said piston and the internal cylindrical surface of axially inner portions of said power cylinder and of axially outer portions of said guide, together, forming a cooling-gas passage, the power unit having a second cooling-gas port, said latter port communicating with said cooling-gas passage, said piston being hollow except at its top, the wall of said piston being perforated, a tubular conduit subdividing the space within said power piston into a radially exterior passage and a radially interior passage, said exterior passage communicating with the said perforation, said interior passage communicating at its axially outer end adjacent to said piston top with said exterior passage and communicating at its axially inner end with the hollow within said crosshead and with said crankcase, the arrangement being such that said cooling-gas port communicating with said cooling-gas passage, the said cooling-gas passage, the said perforation, said exterior passage, said interior passage, the hollow within said crosshead, the crankcase and said cooling-gas port communicating therewith, together, are forming a group and are in series and in substantially non-interrupted communication with each other during successive piston strokes, means being provided, causing at least approximately uninterrupted flow of cooling-gas through said group in the above said series and sequence.

21. An internal combustion power unit of the supercharged compression-ignition type having a power cylinder, a cylinder head and a piston, the power unit having an automatically controlled air-inlet port for purposes of scavenging and internally air-cooling and supercharging, the power unit having a fuel inlet port terminating into the compression chamber, the power unit having an automatically controlled outlet port for combustion products, axially outer portions of said piston serving as a power piston containing piston rings sliding snugly within said power cylinder, axially inner portions of said piston serving as a cylindrical crosshead, a cylindrical guide for said crosshead, said guide being connected with said power cylinder and arranged co-axially with and axially inwardly therefrom, a crankshaft and a crankshaft bearing, a connecting rod driven by said crosshead and driving said crankshaft, said guide and said crosshead absorbing the side-thrust caused by said connecting rod, axially middle portions of said piston and the internal cylindrical surfaces of axially inner portions of said power cylinder and of axially outer portions of said guide, together, forming a cooling-fluid passage, the power unit having a cooling-fluid inlet port communicating with said passage, said piston being hollow except at least the piston top, the wall of said piston being perforated, the power unit having a cooling-fluid outlet port communicating with the hollow within said piston, the arrangement being such, that said cooling-fluid port communicating with said passage, the said passage, the perforation within said piston wall, the hollow within said piston and said cooling-fluid outlet port, together, are forming a group and are in series and in communication with each other during each piston stroke, means being provided, causing substantially uninterrupted flow of cooling-fluid through said group in the above said series and sequence.

22. An internal combustion power unit of the supercharged compression-ignition type having a power cylinder, a cylinder head and a piston, the power unit having an automatically controlled air-inlet port for purposes of scavenging and internally air-cooling and supercharging, the power unit having a fuel inlet port terminating into the compression chamber, the power unit having an automatically controlled outlet port for combustion products, axially outer portions of said piston serving as a power piston containing piston rings sliding snugly within said power cylinder, axially inner portions of said piston serving as a cylindrical crosshead, a cylindrical guide for said crosshead, said guide being connected with said power cylinder and arranged co-axially with and axially inwardly therefrom, a crankshaft and a crankshaft bearing, a connecting rod driven by said crosshead and driving said crankshaft, said guide and said crosshead absorbing the side-thrust caused by said connecting rod, axially middle portions of said piston and the internal cylindrical surfaces of axially inner portions of said power cylinder and of axially outer portions of said guide, together, forming a cooling-fluid passage, the power unit having a cooling-fluid inlet port communicating with said passage, the power unit having a cooling-fluid outlet port communicating with said passage, the said cooling-fluid ports communicating with each other substantially uninterruptedly by way of said passage, means being provided producing substantially uninterrupted movement of cooling-fluid successively through said fluid-inlet port, said passage and said fluid outlet port during the reciprocating action of said piston.

23. An internal combustion power unit of the supercharged compression-ignition type having a power cylinder, a cylinder head and a piston, the power unit having an automatically controlled air inlet port for the purposes of scavenging and internally air-cooling and supercharging, the power unit having a fuel inlet port terminating into the compression chamber, the power unit having an automatically controlled outlet port for combustion products, axially outer portions of said piston serving as a power piston containing piston rings sliding snugly within said power cylinder, axially inner portions of said piston being of greater diameter than said power piston and serving as a cylindrical crosshead, a cylindrical guide for said crosshead, said guide being connected with said power cylinder and arranged co-axially with and axially inwardly therefrom, a crankcase, the power unit having an automatically controlled cooling-gas port communicating with said crankcase, a crankshaft and a crankshaft bearing, a connecting rod driven by said crosshead and driving said crankshaft, said guide and said crosshead absorbing the side-thrust caused by said connecting rod and acting as a cooling-gas pump, axially middle portions of said piston and the internal cylindrical surfaces of axially inner portions of said power cylinder and of axially outer portions of said guide and the axially outer surface of said crosshead and the axially inner surface of said power cylinder, together, forming a cooling-gas passage, the power unit having a second automatically controlled cooling-gas port, said latter port establishing communication between said crankcase and said cooling-gas passage, said piston being hollow throughout except the piston top and except axially inner portions of said crosshead, the wall of said hollow piston portions being perforated, said crosshead being subdivided by a partition wall into an axially outer hollow crosshead portion communicating with the hollow within said axially outer piston portions and into an axially inner crosshead portion containing the wrist pin, said hollow axially outer crosshead portion having a separate cooling-gas opening, the power unit having a third cooling-gas port passing through the wall of said guide and communicating with said separate opening, the arrangement being such that said valve-controlled cooling-gas port communicating with said crankcase, the said crankcase, the said second valve-controlled cooling-gas port, the said cooling-gas passage, the said perforation, the hollow within said piston, the said separate cooling-gas opening and the said third cooling-gas port, together, are forming a group and are in series and in communication with each other during at least a considerable portion of each piston stroke, the arrangement causing cooling-gas to flow through said group at least approximately uninterrupted in one direction during the reciprocating action of said piston.

24. A structure as in claim 23, wherein the space within said hollow power piston is subdivided by a tubular conduit into a substantially annular radially exterior passage communicating with said perforation and into a radially interior passage communicating at its axially outer end adjacent to said piston top with said exterior passage and communicating at its axially inner end with said hollow crosshead portion, said cooling-gas being forced to flow successively through said cooling-gas passage, said perforation, said exterior passage, said interior passage and said hollow crosshead portion, substantially in series and in the above said sequence.

25. An internal combustion power unit of the supercharged compression-ignition type having a power cylinder and cylinder head, a piston, the power unit having a fuel-inlet port terminating into the compression chamber, the power unit having an air-inlet port adapted for scavenging and supercharging, the power unit having an outlet port for combustion products, axially outer portions of said piston serving as power piston containing piston rings sliding snugly within said power cylinder, a cylindrical guide for axially inner portions of said piston, said guide being connected with said power cylinder and being arranged co-axially therewith and axially inwardly therefrom, a power shaft, means being provided driving said shaft from said piston, axially middle portions of said piston and the internal cylindrical surfaces of axially inner portions of said power cylinder and of axially outer portions of said guide, together, forming a cooling-fluid passage, the total peripheral width of said passage at the internal power cylinder wall surface being greater than one half of the internal periphery of said power cylinder, portions of said piston being hollow, the wall of said hollow piston portions being perforated adjacent to the axially outer end of said middle piston portions, the power unit having a cooling-fluid port communicating with said passage, the power unit having a second cooling-fluid port communicating with said hollow within said piston, the said cooling-fluid port communicating with said passage, the said passage, said perforation, said hollow within said piston and said second cooling-fluid port, together, forming a group and being arranged substantially in series and in communication with each other during at least a portion of a piston stroke, means causing a considerably greater amount of cooling-fluid to move through said group in one direction than in the opposite direction during the reciprocating motion of said piston.

26. An internal combustion power unit of the supercharged compression-ignition type having a power cylinder and cylinder head, a piston, the power unit having a fuel-inlet port terminating into the compression chamber, the power unit having an air-inlet port adapted for scavenging and supercharging, the power unit having an outlet port for combustion products, axially outer portions of said piston serving as power piston containing piston rings sliding snugly within said power cylinder, a cylindrical guide for axially inner portions of said piston, said guide being connected with said power cylinder and being arranged co-axially therewith and axially inwardly therefrom, a power shaft, means being provided driving said shaft from said piston, axially middle portions of said piston and the internal cylindrical surfaces of axially inner portions of said power cylinder and of axially outer portions of said guide, together, forming a cooling-fluid passage, portions of said piston being hollow, the wall of said hollow piston portions being perforated, the said hollow within said piston being subdivided by a tubular conduit into a radially exterior passage communicating at its axially inner end with said perforation and into a radially interior passage which latter is communicating at its axially outer end adjacent to the piston top with said radially exterior passage, the power unit having a cooling-fluid port communicating with said cooling-fluid passage, the power unit having a second cooling-fluid port communicating with axially inner portions of said radially interior passage, the arrangement being such that the said cooling-fluid port communicating with said cooling-fluid passage, the said latter passage, said perforation, said radially exterior passage, said radially interior passage and said second cooling-fluid port, together, are forming a group and are arranged in series and in communication with each other during at least a portion of a piston stroke, means causing a considerably greater amount of cooling-fluid to move through said group in one direction, than in the opposite direction, during the operation of the power unit.

27. A structure as in claim 26, wherein means are provided, producing cooling-fluid twirl within said radially exterior passage.

28. An internal combustion power unit of the supercharged compression-ignition type having a power cylinder and cylinder head, a piston, the power unit having a fuel-inlet port terminating into the compression chamber, the power unit having an air-inlet port adapted for scavenging and supercharging, the power unit having an outlet port for combustion products, axially outer portions of said piston serving as power piston containing piston rings sliding snugly within said power cylinder, a cylindrical guide for axially inner portions of said piston, said guide being connected with said power cylinder and being arranged co-axially therewith and axially inwardly therefrom, a power shaft, means being provided driving said shaft from said piston, axially middle portions of said piston and internal surfaces of axially inner portions of said power cylinder and of axially outer portions of said guide, together, forming a cooling-fluid passage, the power unit having a cooling-fluid inlet-port communicating with said passage, the power unit having a cooling-fluid outlet-port communicating with said passage, axially outer portions of said passage being of substantially annular shape and surrounding said middle piston portions, said axially outer annular portions of said passage being arranged in communication with and substantially in series between said cooling-fluid ports while said piston is in axially outer positions, means being provided causing cooling-fluid to move in series through said cooling-fluid inlet port and said axially outer annular portions of said passage and said cooling-fluid outlet port during axially outer piston positions.

29. A structure as in claim 28, wherein means are provided, producing substantially uninterrupted movement of cooling-fluid in one direction of flow through said cooling-fluid ports and said cooling-fluid passage.

30. A structure as in claim 28, wherein means are provided, producing cooling-fluid twirl within the said annular-shaped portions of said passage.

31. An internal combustion power unit of the supercharged compression-ignition type having a cylinder and cylinder head, a piston, the power unit having a fuel inlet port terminating into the compression chamber for the purpose of fuel injection into the compression chamber during beginning of the power stroke, the power unit having an automatically controlled air-inlet port adapted for scavenging and supercharging, the power unit having an automatically controlled outlet port for combustion products, axially outer portions of said piston serving as power piston containing piston rings sliding snugly within axially outer portions of said cylinder, axially inner portions of said piston sliding snugly within axially inner portions of said cylinder, axially middle portions of said piston and the internal cylindrical surface of axially middle portions of said cylinder, together, forming a cooling-fluid passage, the power unit having a cooling-fluid inlet port terminating into said passage and having a cooling-fluid outlet port emerging from said passage, each of said cooling-fluid ports passing through the cylinder wall, said passage being arranged substantially in series between said cooling-fluid ports and being in uninterrupted communication with said cooling-fluid ports during the greater at least portion of a piston stroke, means causing cooling-fluid to move through said cooling-fluid inlet port and said passage and said cooling-fluid outlet port during the said portion of said piston stroke, a power shaft, means driving said shaft from said piston.

32. A structure as in claim 31, wherein said cooling-fluid ports are in substantially permanent communication with each other by way of said passage, means being provided causing cooling-fluid to move substantially uninterruptedly through said cooling-fluid inlet port, said passage and said cooling-fluid outlet port during the reciprocating motion of said piston.

33. A structure as in claim 31, wherein at least portions of said cooling-fluid passage are of annular shape and are surrounding said middle piston portions and wherein means are provided producing cooling-fluid twirl within said annular shaped portions of said passage.

34. A supercharged, compression-ignition, internal combustion power unit, having a power cylinder and cylinder head, a power piston having piston rings sliding snugly within said cylinder, the power unit compression chamber being arranged substantially concentrically with the cylinder axis and being in substantially non-restricted communication with axially outer portions of said cylinder, the power unit having a fuel-inlet port adapted for fuel-injection into said compression chamber and said axially outer cylinder portions, an automatically controlled air-inlet port being provided for scavenging and supercharging the power unit and for primarily internally air-cooling said compression chamber and said cylinder portions, said latter port passing through the wall of said compression chamber and said cylinder portions, and terminating therein tangentially at least adjacent to said compression chamber, the power unit having an automatically controlled outlet port for combustion products and scavenging air, the shape and said concentric arrangement of said compression chamber and the said non-restricted communication between said compression chamber and cylinder portions, being such, that as a result of said tangential air-inlet, strong substantially unobstructed cooling-air twirl is produced primarily within said compression chamber and cylinder portions around said cylinder axis during scavenging and supercharging, the twirl continuing substantially uninterrupted in one direction of rotation around the said axis during compression, fuel-injection, gasification and combustion, the power unit having a power shaft, means driving said shaft from said piston.

35. A structure as in claim 34, wherein additional internal cooing means are provided for separately cooling the axially middle portions of said power cylinder, said latter cooling means including a cooling-fluid passage formed between said axially middle portions of said cylinder and axially middle portions of said piston, a cooling-fluid inlet port and a cooling-fluid outlet port being provided for said passage, means causing cooling-fluid to flow in series through said fluid-inlet port and said passage and said fluid outlet port during successive piston strokes.

36. A structure as in claim 34, wherein a separate cooling-fluid passage is formed between axially middle power cylinder-and piston-portions, a cooling-fluid inlet port being provided for said cooling-fluid passage, portions of the said piston being hollow and perforated, said cooling-fluid passage communicating with said perforation and with said hollow within the said piston, a cooling-fluid outlet port being provided emerging from within said hollow piston portions, means causing cooling-fluid to flow in series through said cooling-fluid inlet port, said passage, said perforation, said hollow within said piston and said cooling-fluid outlet port in the above said sequence during successive piston strokes.

37. A structure as in claim 34, wherein a separate cooling-fluid passage is formed between axially middle power cylinder-and piston-portions, a cooling-fluid port being provided communicating with said cooling-fluid passage, portions of said piston being hollow and perforated, said cooling-fluid passage communicating with said perforation and with said hollow within said piston, the space within said hollow piston portions being subdivided by a tubular conduit into a radially exterior passage communicating at its axially inner end with said perforation and into a radially interior passage communicating at its axially outer end adjacent to the piston top with said exterior passage, a second cooling-fluid port being provided, said latter port communicating with the axially inner end portion of said interior passage, the said cooling-fluid inlet port communicating with said cooling-fluid passage, the said cooling-fluid passage, said perforation, said exterior passage, said interior passage and said second cooling-fluid port being arranged in series, together forming a group, means being provided causing a considerably greater amount of cooling-fluid to flow through said group in one direction than in the opposite direction during the reciprocating motion of said piston.

38. A structure as in claim 34, wherein the ratio of compression at normal load and supercharging is 1 to 20, more or less, producing greater air-density, higher air-temperature and greater heat concentration than heretofore within a given cubic compression space, thus accelerating vaporization, gasification and ignition during beginning of and throughout late and gradual fuel injection.

39. A structure as in claim 34, wherein said scavenging- and supercharging-air inlet port terminates within said compression chamber and said cylinder portions in tangential and axially outward direction.

40. A structure as in claim 34, wherein said outlet port provided for combination products and scavenging air is power piston controlled and passes through the wall of said power cylinder axially further inwardly than said air-inlet port.

41. A structure as in claim 34, wherein said combustion products emerge from within axially middle cylinder portions, the scavenging air entering through said air-inlet port into the axially outermost portions of said cylinder and into said compression chamber tangentially, at least adjacent to the periphery of said cylinder and of said compression chamber, causing primarily powerful twirl and internal air-cooling and scavenging within said compression chamber and said cylinder portions, the major portion of the scavenging air flowing successively spirally inwardly through said cylinder causing scavenging and internal air-cooling of axially middle cylinder portions and air-cooling the axially outer surface of the power piston top before escaping through said outlet port.

42. A structure as in claim 34, wherein said power unit has a hollow cylinder head, the interior of said head being arranged substantially concentrically with said cylinder axis and forming a portion of said compression chamber, means being provided, connected with said cylinder, causing axially inward pressure on axially outer portions of said head substantially solely adjacent to said cylinder axis producing uniform axial pressure and a uniformly gas-and airtight joint between said head and said cylinder adjacent to the cylinder bore and uniform strain on said head.

43. A structure as in claim 34, wherein said power unit has a cylinder head being substantially conical interiorly and exteriorly, the interior of said cylinder head forming at least a portion of said compression chamber and being arranged substantially concentrically with said cylinder axis, a casing or the like, surrounding said head, the exterior of said head and the interior of said casing, together, forming a substantially annular contracted space around cylinder head wall portions adjacent to said fuel inlet port, means circulating cooling-fluid axially through said annular space alongside of the exterior of said head externally cooling especially said cylinder head wall portions adjacent to said fuel-inlet port.

44. An internal combustion power unit of the compression-ignition type having a power cylinder and a main casing for said power unit, a cylinder head, a power piston having piston rings sliding snugly within said cylinder, the power unit having an air-inlet port for the purpose of scavenging and supercharging, the power unit having an outlet port for combustion products, said cylinder head having a conical bore within its axially outer portions, a fuel-inlet port extending from said bore through said head into the compression-chamber of the power unit, a spray-valve, mechanism being externally cylindrical and having a taper axially inner end-portion fitted and ground fuel-tight into said conical bore for the purpose of injecting fuel through said fuel-inlet port into said compression chamber, means being provided non-connected with said head for pressing said valve mechanism fuel-tight onto said head, the pressure exerted by said valve mechanism onto said head simultaneously pressing said head gas-and air-tight onto said cylinder, said casing having an axially outward extension, an annular space being provided between said head and said extension, means circulating cooling fluid through said annular space, an internally cylindrical guide for said cylindrical spray valve mechanism, said guide being connected with said extension, the arrangement being such, that said taper portion of said valve mechanism, said conical bore within said cylinder head, said externally cylindrical portion of the valve mechanism, said internally cylindrical guide for said spray valve mechanism and said power cylinder, are perfectly axially aligned with each other, a power shaft and means driving said shaft from said piston.

FRANCIS MARBURG.